United States Patent
Propheter-Hinckley

(10) Patent No.: US 10,677,091 B2
(45) Date of Patent: Jun. 9, 2020

(54) AIRFOIL WITH SEALED BAFFLE

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 685 days.

(21) Appl. No.: 15/354,132

(22) Filed: Nov. 17, 2016

(65) Prior Publication Data

US 2018/0135459 A1 May 17, 2018

(51) Int. Cl.
*F01D 25/12* (2006.01)
*F02C 3/04* (2006.01)
(Continued)

(52) U.S. Cl.
CPC ............ *F01D 25/12* (2013.01); *F01D 5/147* (2013.01); *F01D 5/18* (2013.01); *F01D 5/188* (2013.01); *F01D 5/189* (2013.01); *F01D 9/02* (2013.01); *F01D 9/042* (2013.01); *F01D 9/065* (2013.01); *F01D 11/003* (2013.01); *F01D 11/005* (2013.01); *F02C 3/04* (2013.01); *F04D 29/083* (2013.01); *F04D 29/324* (2013.01);
(Continued)

(58) Field of Classification Search
CPC .......... F01D 5/147; F01D 5/186; F01D 5/187; F01D 5/188; F01D 5/189; F01D 11/005; F01D 9/042; F01D 9/065; F01D 17/162; F01D 5/18; F05D 2260/20; F05D 2260/201; F05D 2260/202; F05D 2230/64; F05D 2230/51; F04D 29/563; F04D 29/582; F04D 29/584
USPC ................................ 415/159–162; 416/96 A
See application file for complete search history.

(56) References Cited

U.S. PATENT DOCUMENTS

| 3,215,511 A |   | 11/1965 | Chisholm |
| 3,858,290 A | * | 1/1975 | Albani ................... B23P 15/02 29/889.722 |

(Continued)

FOREIGN PATENT DOCUMENTS

| EP | 0764764 | 3/1997 |
| EP | 1764481 | 3/2007 |

(Continued)

OTHER PUBLICATIONS

European Search Report for European Application No. 17202414.3 dated Jun. 4, 2018.

(Continued)

*Primary Examiner* — Christopher Verdier
(74) *Attorney, Agent, or Firm* — Carlson, Gaskey & Olds, P.C.

(57) ABSTRACT

An airfoil includes a supply passage to provide a coolant, an airfoil section that has walls that define an internal cavity, a baffle seated in the internal cavity, and a seal proximate the edge of the baffle. The baffle is seated such that there is a gap between the baffle and at least one of the walls. The baffle includes a baffle wall that has cooling holes and that defines an interior baffle region. The seal seals off the gap such that the coolant that exits the supply passage will be directed to flow into the interior baffle region.

12 Claims, 4 Drawing Sheets

(51) Int. Cl.
*F01D 5/18* (2006.01)
*F01D 9/02* (2006.01)
*F01D 11/00* (2006.01)
*F04D 29/32* (2006.01)
*F04D 29/54* (2006.01)
*F04D 29/58* (2006.01)
*F04D 29/08* (2006.01)
*F01D 5/14* (2006.01)
*F01D 9/04* (2006.01)
*F04D 29/56* (2006.01)
*F01D 9/06* (2006.01)
*F01D 17/16* (2006.01)

(52) U.S. Cl.
CPC ......... *F04D 29/542* (2013.01); *F04D 29/563* (2013.01); *F04D 29/582* (2013.01); *F04D 29/584* (2013.01); *F01D 17/162* (2013.01); *F05D 2220/32* (2013.01); *F05D 2230/51* (2013.01); *F05D 2230/64* (2013.01); *F05D 2240/35* (2013.01); *F05D 2260/201* (2013.01); *Y02T 50/676* (2013.01)

(56) References Cited

U.S. PATENT DOCUMENTS

| | | | |
|---|---|---|---|
| 4,137,008 A | 1/1979 | Grant et al. | |
| 4,247,259 A | 1/1981 | Saboe et al. | |
| 4,396,349 A | 8/1983 | Hueber | |
| 4,914,794 A | 4/1990 | Strangman | |
| 5,358,379 A | 10/1994 | Pepperman et al. | |
| 5,538,380 A | 7/1996 | Norton et al. | |
| 5,630,700 A | 5/1997 | Olsen et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,164,903 A * | 12/2000 | Kouris | F01D 9/04 415/135 |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2007/0231150 A1 * | 10/2007 | Dervaux | F01D 5/18 416/224 |
| 2008/0159850 A1 | 7/2008 | Tholen et al. | |
| 2010/0080687 A1 * | 4/2010 | Vance | F01D 5/147 415/115 |
| 2010/0136258 A1 | 6/2010 | Strock et al. | |
| 2016/0090851 A1 | 3/2016 | Carr et al. | |

FOREIGN PATENT DOCUMENTS

| | | |
|---|---|---|
| EP | 2105579 | 9/2009 |
| EP | 2853688 | 4/2015 |
| EP | 3000979 A1 | 3/2016 |
| GB | 2058944 A | 4/1981 |
| GB | 2272453 | 5/1994 |
| JP | 61066802 | 4/1986 |
| JP | 05321602 | 12/1993 |
| NL | 7107630 | 12/1971 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.
European Search Report for European Patent Application No. 19196407.1 completed Nov. 27, 2019.

\* cited by examiner

AIRFOIL WITH SEALED BAFFLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes a supply passage to provide a coolant and an airfoil section that has walls that define an internal cavity. A baffle is seated in the internal cavity such that there is a gap between the baffle and at least one of the walls. The baffle has a baffle wall that has cooling holes and a baffle edge adjacent the supply passage. The baffle wall defines an interior baffle region. There is a seal proximate the baffle edge that seals off the gap such that the coolant that exits the supply passage will be directed to flow into the interior baffle region.

In a further embodiment of any of the foregoing embodiments, the seal is between the baffle edge and the walls.

In a further embodiment of any of the foregoing embodiments, either the seal or the at least one wall includes a lip having a first seal surface and the other of the seal or the at least one wall includes a second seal surface abutting the first seal surface of the lip.

In a further embodiment of any of the foregoing embodiments, the lip is on the baffle and is a flared portion at the baffle edge.

In a further embodiment of any of the foregoing embodiments, the lip is on the baffle and includes a spring biasing the first seal surface and the second seal surface together.

In a further embodiment of any of the foregoing embodiments, the lip is on the at least one wall and includes a protrusion having the first seal surface.

In a further embodiment of any of the foregoing embodiments, the internal cavity is at a leading end of the airfoil section.

A further embodiment of any of the foregoing embodiments include first and second end sections between which the airfoil section is mechanically clamped.

A further embodiment of any of the foregoing embodiments include a tie member securing the first and second end sections together. The tie member extends through the baffle.

In a further embodiment of any of the foregoing embodiments, the airfoil section includes at least one additional internal cavity aft of the internal cavity in which the baffle is disposed. The supply passage is disposed radially of the additional internal cavity.

In a further embodiment of any of the foregoing embodiments, a divider wall separates the supply passage from the additional internal cavity, and one of the first or second end sections includes an inlet passage disposed radially of the supply passage and that opens to the supply passage.

In a further embodiment of any of the foregoing embodiments, the inlet passage is in a spindle of either the first or second end section.

In a further embodiment of any of the foregoing embodiments, the airfoil section interfits with the first end section such that an exterior surface of the airfoil section is substantially flush with an exterior surface of the first end section.

A gas turbine engine according to an example of the present disclosure include a compressor section, a combustor in fluid communication with the compressor section, and a turbine section in fluid communication with the combustor. One of the turbine section or the compressor section includes an airfoil that has a supply passage to provide a coolant and an airfoil section that includes walls that define an internal cavity. A baffle is seated in the internal cavity such that there is a gap between the baffle and at least one of the walls. The baffle includes a baffle wall that has cooling holes and a baffle edge adjacent the supply passage. The baffle wall defines an interior baffle region. There is a seal located proximate the baffle edge that seals off the gap such that the coolant that exits the supply passage will be directed to flow into the interior baffle region.

In a further embodiment of any of the foregoing embodiments, either the seal or the at least one wall includes a lip having a first seal surface and the other of the seal or the at least one wall includes a second seal surface abutting the first seal surface of the lip.

In a further embodiment of any of the foregoing embodiments, the lip is on the baffle and is a flared portion at the baffle edge.

In a further embodiment of any of the foregoing embodiments, the lip is on the at least one wall and includes a protrusion having the first seal surface.

A further embodiment of any of the foregoing embodiments includes first and second end sections between which the airfoil section is mechanically clamped and a tie member securing the first and second end sections together, and the internal cavity is at a leading end of the airfoil section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
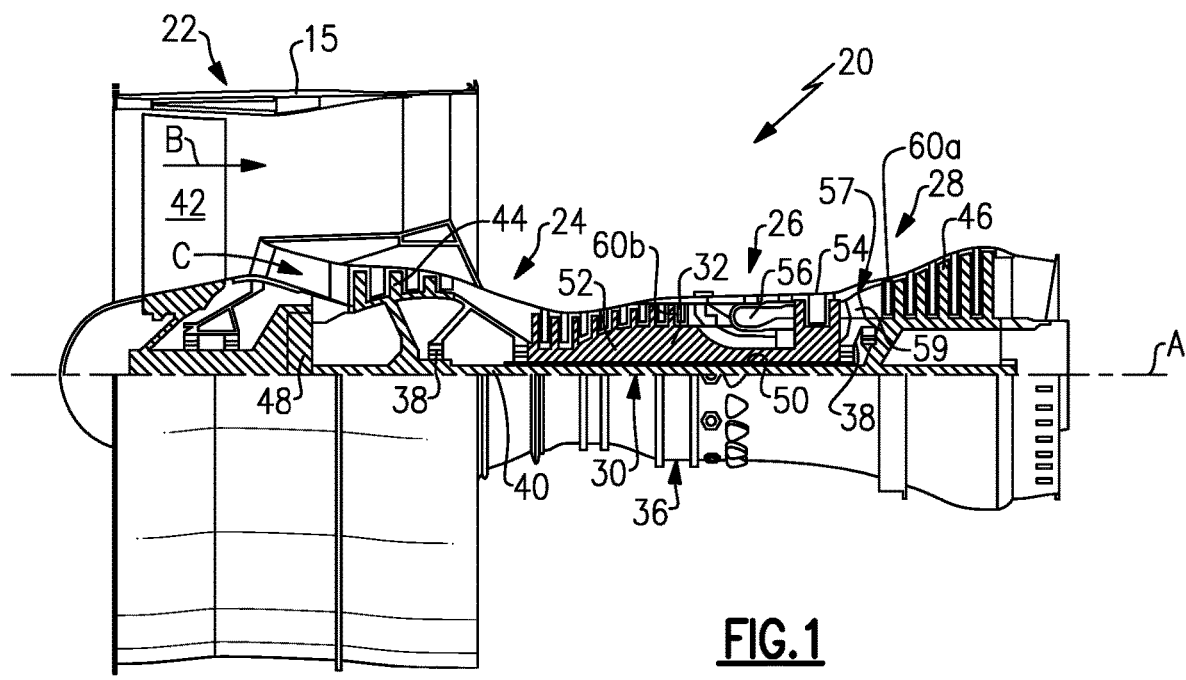
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
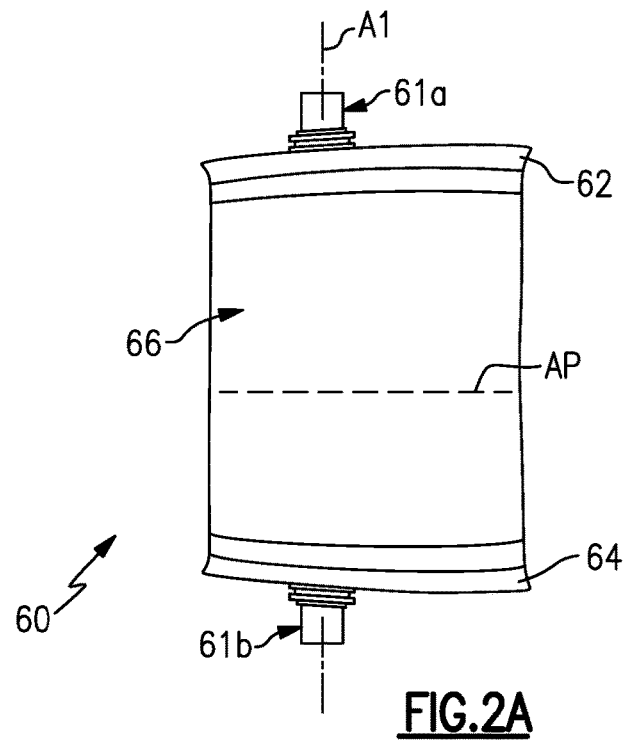
FIG. 2A illustrates an example airfoil.
Figure 2B:
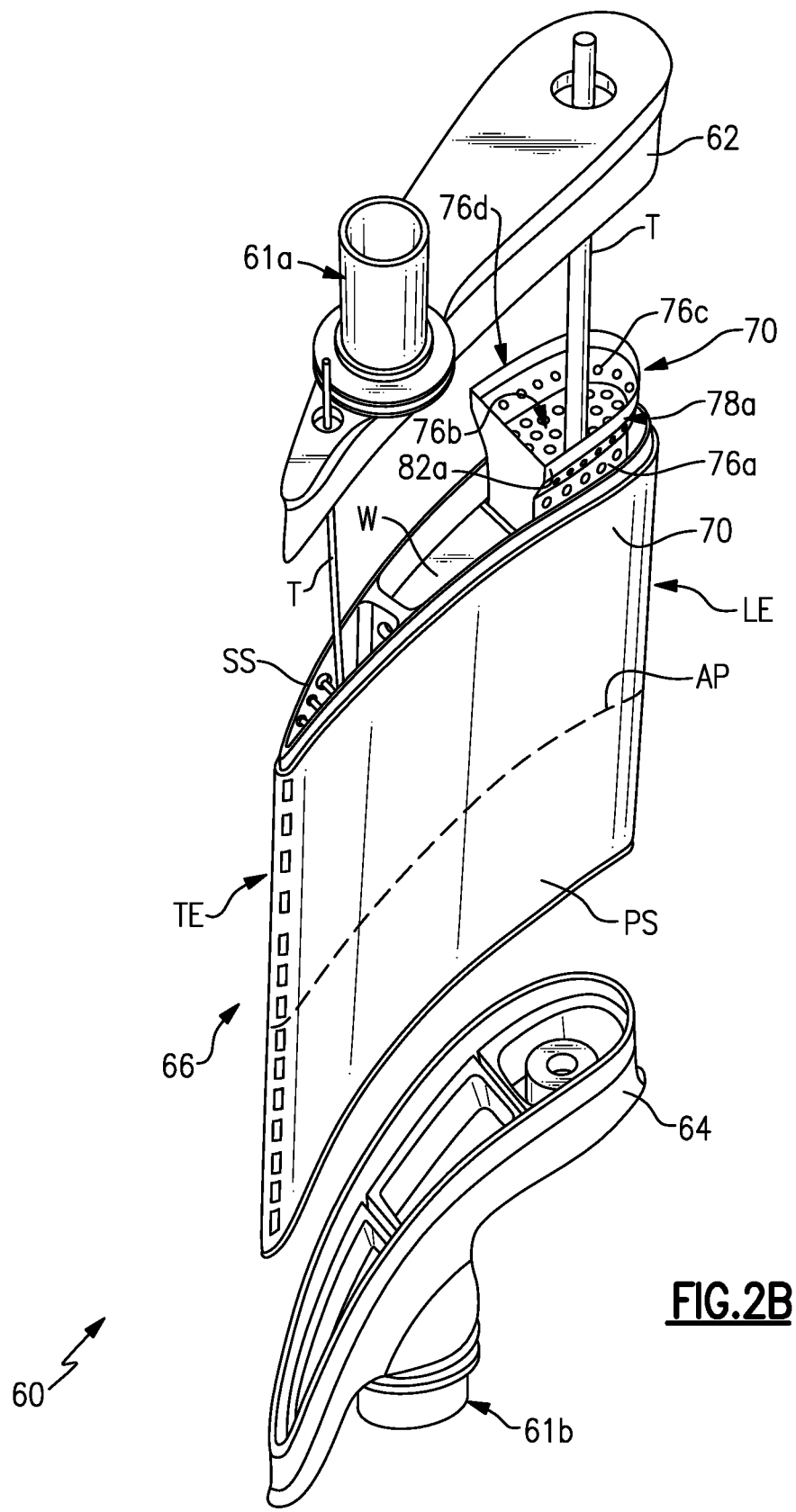
FIG. 2B illustrates an exploded view of the airfoil of FIG. 2A.
Figure 2C:
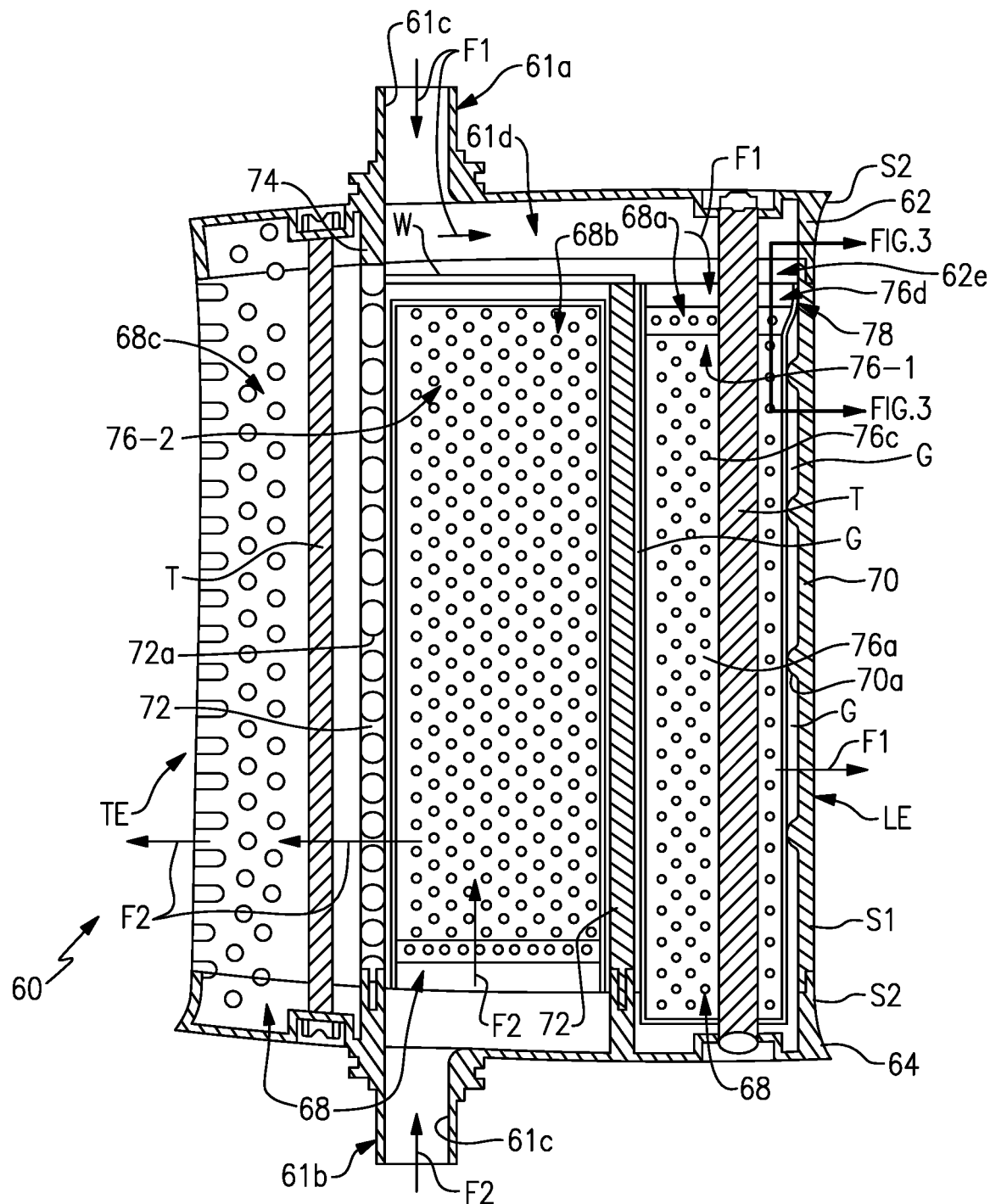
FIG. 2C illustrates a sectioned view of the airfoil of FIG. 2A.

FIG. 2A illustrates selected portions of an example airfoil 60 used in the engine 20, FIG. 2B illustrates an exploded view of the airfoil 60, and FIG. 2C illustrates a sectioned view of the airfoil 60. For instance, the airfoil 60 can be a turbine vane, as represented at 60a in FIG. 1, or a compressor vane, as represented at 60b in FIG. 1. As will be appreciated, although the examples herein may be described in the context of a vane, this disclosure is not limited to vanes, and the examples may also be applicable to blades or other airfoils that are exposed to high temperatures.

The airfoil 60 includes a first or outer end section 62, a second or inner end section 64, and an airfoil section 66 that spans in a longitudinal direction between the first and second end sections 62/64. The longitudinal direction is also the radial direction in the engine 20 with regard to the engine central axis A. The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

In this example, the airfoil 60 is a variable vane. In this regard, the first end 62 of the airfoil 60 includes a first axle or spindle 61a and the second end 64 includes a second axle or spindle 61b. The airfoil 60 is rotatable about the spindles 61a/61b (about axis A1). The spindles 61a/61b include respective inlet passages 61c. The inlet passage 61c in the spindle 61a opens to a supply passage 61d in or at least partially in the first end section 62. The inlet passages 61c receive coolant air, such as coolant bleed air from the compressor section 24.

The airfoil section 66 is hollow and includes a plurality of internal cavities 68. In this example, the airfoil section 66 includes three internal cavities, which are individually designated 68a/68b/68c. As will be appreciated, modified examples may include fewer cavities or additional cavities. Here, cavity 68a is the forward-most cavity adjacent the leading end (LE), cavity 68c is the aft-most cavity adjacent the trailing end (TE), and cavity 68b is an intermediate cavity adjacent the pressure side (PS) and suction side (SS). Cavity 68b may also be considered an aft cavity, aft of the cavity 68a. The supply passage 61d is located radially of the cavities 68 and is divided from the cavity 68b by a divider wall W. In this example, the supply passage 61d is radially outwards of the cavities 68, relative to engine central axis A. As will be appreciated, the airfoil 60 could be reconfigured in other examples such that the end section 62 is the inner end and the end section 64 is the outer end.

The end sections 62/64 and the airfoil section 66 are most typically separate pieces initially. The airfoil section 66 is mechanically clamped between the end sections 62/64. For instance, one or more tie members T extends through the internal cavities 68 of the airfoil section 66 and secures the first and second end sections 62/64 together to trap or clamp the airfoil section 66 there between. The tie member or members T may be secured by fasteners, such as but not limited to threaded fasteners, by welds, or the like. In this regard, the airfoil section 66 may fit with the end sections 62/64 to ensure proper positioning of the airfoil section 66. As an example, the airfoil section 66 interfits with the end sections 62/64 such that an exterior surface S1 (FIG. 2C) of the airfoil section 66 is substantially flush with the exterior surfaces S2 of the end sections 62/64. For instance, the airfoil section 66 may have a shoulder that is complimentary to shoulders on the respective end sections 62/64 so that the surfaces S1/S2 are substantially flush.

In this example, the cavities 68a/68b/68c extend between the first and second end sections 62/64 and are bound on lateral sides by walls 70 that form the airfoil section 60. The cavities 68a/68b/68c are also divided and bound on lateral sides by internal ribs or walls 72 of the airfoil section 66. For instance, the wall 72 that divides the cavities 68a/68b may be substantially solid and may seal the cavities 68a/68b from each other. The wall 72 that divides the cavities 68b/68c includes cooling holes 72a.

To facilitate distribution of the cooling air, the airfoil 60 includes one or more baffles, generally designated 76. In FIG. 2C the baffles 76 are individually designated 76-1 and 76-2. The baffle 76-1 is seated in the cavity 68a, and the baffle 76-2 is seated in the cavity 68b. For instance, the baffles 76-1/76-2 are seated on protrusions 70a of the walls 70. The protrusions 70a seat at least the baffle 76-1 such that there is a gap (G) between the baffle 76-1 and at least one of the walls 70.

Cooling air, generally designated at F1, is provided though the inlet passage 61c in spindle 61a into the supply passage 61d. The supply passage 61d feeds the cooling air F1 to the cavity 68a, to cool the leading end (LE) of the airfoil section 66. The cooling air F1 may be discharged into the core gas path through cooling holes in the leading end (LE). Cooling air, generally designated at F2, is also provided though the inlet passage 61c in spindle 61b into the cavity 68b. The cooling air F2 may be at a different temperature and/or pressure than the cooling air F1. The cavity 68b feeds the cooling air F2 through cooling holes 72a into the cavity 68c. The cooling air F2 may discharged into the core gas path through cooling holes in the trailing end (TE). The airfoil 60 thus has at least two cooling circuits that are isolated or substantially isolated from each other.

The baffle 76-1 is generally radially elongated and is formed of a baffle wall 76a. In this example, the baffle wall 76a defines an interior baffle region 76b. For instance, the baffle wall 76a circumscribes the interior baffle region 76b. The baffle wall 76a also includes cooling holes 76c. The cooling holes 76c are through-holes that open on one side to the interior baffle region 76b and open the other side to the gap (G).

Figure 3:
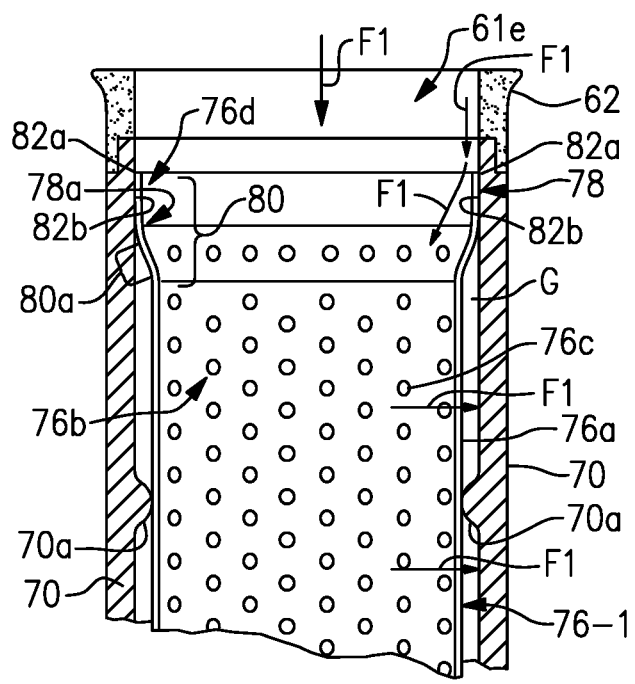
FIG. 3 illustrates a section of the airfoil of FIG. 2C, showing a seal in the airfoil.

As also shown in the sectioned view in FIG. 3, the baffle 76-1 further includes a baffle edge 76d adjacent an outlet 61e of the supply passage 61d. The baffle edge 76d is the end region of the baffle 76-1 and includes the terminal face of the baffle 76-1. There is a seal 78 proximate the baffle edge 76d. For example, the seal 78 may be flush or substantially flush with the terminal face of the baffle 76-1. Alternatively, the seal 78 may be spaced inwards by a distance from the terminal face of the baffle 76-1. In one example, that distance is less than 50% of the total radial length of the baffle 76-1. In further examples, that distance is less than 15% of the total radial length of the baffle 76-1.

The seal 78 seals off the gap (G) proximate the baffle edge 76d such that the coolant air F1 that exits the supply passage 61d via the outlet 61e will be directed into the interior baffle region 76b rather than into the gap (G). Once in the interior baffle region 76b, the baffle 76-1 distributes the cooling air F1 via cooling holes 76c across the gap (G) to impinge on the walls 70. The cooling air F1 may then be discharged into the core gas path through cooling holes in the leading end (LE). The baffle 76-1 thus facilitates proper distribution of the cooling air F1. In contrast, if the cooling air F1 were permitted to flow directly into the gap (G) from the outlet 61e of the supply passage 61d, thereby bypassing the baffle 76-1, the effectiveness of the baffle 76-1 for properly distributing the cooling air may be diminished.

The seal 78 is formed by features on the baffle 76-1 and walls 70 of the airfoil section 66. In the illustrated example, the baffle edge 76d of the baffle 76-1 includes a lip 78a. In this example, the lip 78a is a flared portion 80 of the baffle edge 76d. The lip 78a has a first seal surface 82a and the wall 70 includes a second seal surface 82b that abuts the first seal surface 82a of the lip 78a. For instance, the seal surfaces 82a/82b are substantially radially oriented surfaces, and thus reduce the lateral or axial space required for the seal 78. Likewise, the wall 72 may also include a second seal surface that abuts the first seal surface 82a. For example, the flared portion 80 may be larger than the cavity 68a such that there is an interference fit between the seal surfaces 82a/82b.

Additionally, the flared portion 80 may include a spring 80a that biases the seal surfaces 82a/82b together. For instance, the spring 80a is a leg of the flared portion 80 that deforms in within its elastic deformation region due to the interference fit, to maintain a biasing force.

Figure 4:
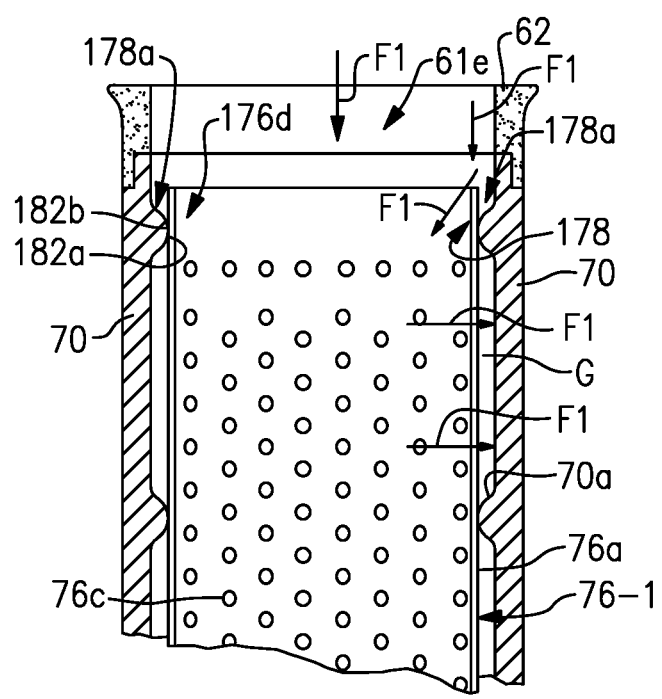
FIG. 4 illustrates another example of a seal in an airfoil.

FIG. 4 illustrates an alternate example of a seal 178 in which like reference numerals designate like elements where appropriate and reference numerals with the addition of one-hundred or multiples thereof designate modified elements that are understood to incorporate the same features and benefits of the corresponding elements. Here, the features on the baffle 76-1 and walls 70 are, in essence, flipped from the prior example. In this case, the lip 178a is on the wall 70 and includes the first seal surface 182a, and the baffle 76-1 includes the second seal surface 182b on the baffle edge 176d. For instance, the lip 178a is a ridge that extends along the inside of the wall 70 in the leading end (LE). Additionally in this example, rather than being flared, the baffle edge 176d is straight. Again, the seal 178 seals off the gap (G) such that the coolant air F1 that exits the supply passage 61d via the outlet 61e will be directed into the interior baffle region 76b rather than into the gap (G). As will be appreciated, the baffle 76-2 may include similar features as described herein for the baffle 76-1.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    a supply passage to provide a coolant;
    an airfoil section including walls defining an internal cavity;
    a baffle seated in the internal cavity such that there is a gap between the baffle and at least one of the walls, the baffle including a baffle wall having cooling holes and a baffle edge adjacent the supply passage, the baffle wall defining an interior baffle region;
    a seal proximate the baffle edge, the seal sealing off the gap such that the coolant that exits the supply passage will be directed to flow into the interior baffle region; and
    first and second end sections between which the airfoil section is mechanically clamped, wherein the airfoil section includes at least one additional internal cavity aft of the internal cavity in which the baffle is disposed, the supply passage being disposed radially adjacent the additional internal cavity and proximate one of the first and second end sections; and
    a divider wall separating the supply passage from the additional internal cavity, the proximate one of the first or second end sections including a radial inlet passage that opens to the supply passage.

2. The airfoil as recited in claim 1, wherein the seal is between the baffle edge and the walls.

3. The airfoil as recited in claim 1, wherein either the seal or the at least one wall includes a lip having a first seal surface and the other of the seal or the at least one wall includes a second seal surface abutting the first seal surface of the lip.

4. The airfoil as recited in claim 3, wherein the lip is on the baffle and is a flared portion at the baffle edge.

5. The airfoil as recited in claim 3, wherein the lip is on the baffle and includes a spring biasing the first seal surface and the second seal surface together.

6. The airfoil as recited in claim 3, wherein the lip is on the at least one wall and includes a protrusion having the first seal surface.

7. The airfoil as recited in claim 1, wherein the internal cavity is at a leading end of the airfoil section.

8. The airfoil as recited in claim 1, further comprising a tie member securing the first and second end sections together, the tie member extending through the baffle.

9. The airfoil as recited in claim 1, wherein the inlet passage is in a spindle.

10. The airfoil as recited in claim 1, wherein the airfoil section interfits with the first end section such that an exterior surface of the airfoil section is substantially flush with an exterior surface of the first end section.

11. A gas turbine engine comprising:
    a compressor section;
    a combustor in fluid communication with the compressor section; and
    a turbine section in fluid communication with the combustor,
    at least one of the turbine section or the compressor section including an airfoil having
    a supply passage to provide a coolant,
    an airfoil section including walls defining an internal cavity,
    a baffle seated in the internal cavity such that there is a gap between the baffle and at least one of the walls, the baffle including a baffle wall having cooling holes and a baffle edge adjacent the supply passage, the baffle wall defining an interior baffle region,
    a seal proximate the baffle edge, the seal sealing off the gap such that the coolant that exits the supply passage will be directed to flow into the interior baffle region, either the seal or the at least one wall including a lip having a first seal surface and the other of the seal or the at least one wall including a second seal surface abutting the first seal surface of the lip, wherein the lip is on the baffle and is a flared portion at the baffle edge, the flared portion including a spring biasing the first seal surface and the second seal surface together, and first and second end sections between which the airfoil section is mechanically clamped and a tie member securing the first and second end sections together, and the internal cavity is at a leading end of the airfoil section.

12. The gas turbine engine as recited in claim 11, wherein the airfoil section includes at least one additional internal cavity aft of the internal cavity in which the baffle is disposed, the supply passage being disposed radially adjacent the additional internal cavity and proximate one of the first and second end sections, and a divider wall separating the supply passage from the additional internal cavity, the proximate one of the first or second end sections including a radial inlet passage that opens to the supply passage.

* * * * *